US006208935B1

(12) United States Patent
Yamada et al.

(10) Patent No.: US 6,208,935 B1
(45) Date of Patent: Mar. 27, 2001

(54) MAP APPLICATION SYSTEM

(75) Inventors: Takaaki Yamada, Oosaka; Shuji Kitazawa, Tokyo; Hiroshi Tsuji, Itami; Yoshiaki Yoshikawa, Ikoma; Maki Mori, Kawasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/301,362

(22) Filed: Apr. 29, 1999

(30) Foreign Application Priority Data

May 1, 1998 (JP) .................................................. 10-121569

(51) Int. Cl.$^7$ ....................... G06F 165/00; G06F 17/00; G06G 7/78; G06G 1/122
(52) U.S. Cl. .................... 701/209; 701/208; 701/212; 701/202
(58) Field of Search .................................. 701/209, 208, 701/202, 200, 212

(56) References Cited

U.S. PATENT DOCUMENTS

| | | | | |
|---|---|---|---|---|
| 5,121,326 | * | 6/1992 | Moroto et al. | 701/212 |
| 5,365,449 | * | 11/1994 | Kashiwazaki | 701/208 |
| 5,422,815 | * | 6/1995 | Hijikata | 701/208 |
| 5,506,779 | * | 4/1996 | Kanki | 701/209 |
| 5,557,522 | * | 9/1996 | Nakayama et al. | 701/200 |
| 5,633,946 | * | 5/1997 | Lachinski et al. | 382/103 |
| 5,675,492 | * | 10/1997 | Tsuyuki | 701/200 |
| 5,724,924 | * | 3/1998 | Michels | 123/41.12 |
| 5,774,828 | * | 6/1998 | Brunts et al. | 701/210 |
| 5,784,059 | * | 7/1998 | Morimoto et al. | 345/353 |
| 5,845,228 | * | 12/1998 | Uekawa et al. | 701/209 |
| 5,874,905 | * | 2/1999 | Nanba et al. | 340/995 |
| 5,893,045 | * | 4/1999 | Kusama et al. | 701/211 |
| 5,899,955 | * | 5/1999 | Yagyu et al. | 701/209 |
| 5,926,118 | * | 7/1999 | Hayeshide et al. | . |
| 5,928,305 | * | 7/1999 | Nomura | 701/207 |
| 5,978,733 | * | 11/1999 | Deshimaru et al. | 701/209 |
| 6,012,014 | * | 1/2000 | Koyanagi et al. | 701/208 |
| 6,014,607 | * | 1/2000 | Yagyu et al. | 701/202 |

FOREIGN PATENT DOCUMENTS 5-27680   2/1993 (JP) .
6-252324  9/1994 (JP) .

* cited by examiner

Primary Examiner—William A. Cuchlinski, Jr.
Assistant Examiner—Olga Hernandez
(74) Attorney, Agent, or Firm—Mattingly, Stanger & Malur, P.C.

(57) ABSTRACT

The present invention is directed to a map application system that employs an automatic stroll method of strolling through a virtual space into the route and distribution information change according to the interests of a user and the time of day (ie. daytime vs. nighttime, etc.). In the present invention, an article contributed to a contribution server from a contribution terminal is stored temporarily in a contribution DB. Each article is converted to information related to a spatial position by a spatial information structure process and is stored in a spatial information DB. The contribution server returns an article with the relation to the position of the neighborhood according to the input of a region name on a stroll terminal. The stroll terminal starts a stroll on the basis of a region name inputted as an initial value, and automatically sets a route on the basis of the interest information of a user. Information about the route is provided from contribution server and is appropriately displayed.

14 Claims, 12 Drawing Sheets

| ID | Network address | Spatial attribute | | | Interest attribute |
|---|---|---|---|---|---|
| | | Address | Region | Objective thing | |
| 1 | http://kiji1 | 〒5590001: ***, Nankohigashi 8 chome, Suminoe-ku, Osaka-shi | 35617, 1123, 33113, 1223 | The H company Kansai branch | Company |
| 2 | http://kiji2 | 〒112345: ***, Ochanomizu, Chiyoda-ku, Tokyo-to | 45647, 2920, 57113, 1009 | The H company head office | Company |
| 3 | http://kiji3 | 〒5590001: ***, Senriyama 6 chome, Suita-shi, Osaka-fu | 33245, 2324, 15118, 4421 | The B park | Sightseeing |
| ... | | | | | |

| Interest attribute | Information value |
|---|---|
| Company | 3 |
| Sightseeing | 10 |
| Eating | 5 |
| Shopping | 10 |
| Facilities | 1 |
| ... | ... |

Figure 11:
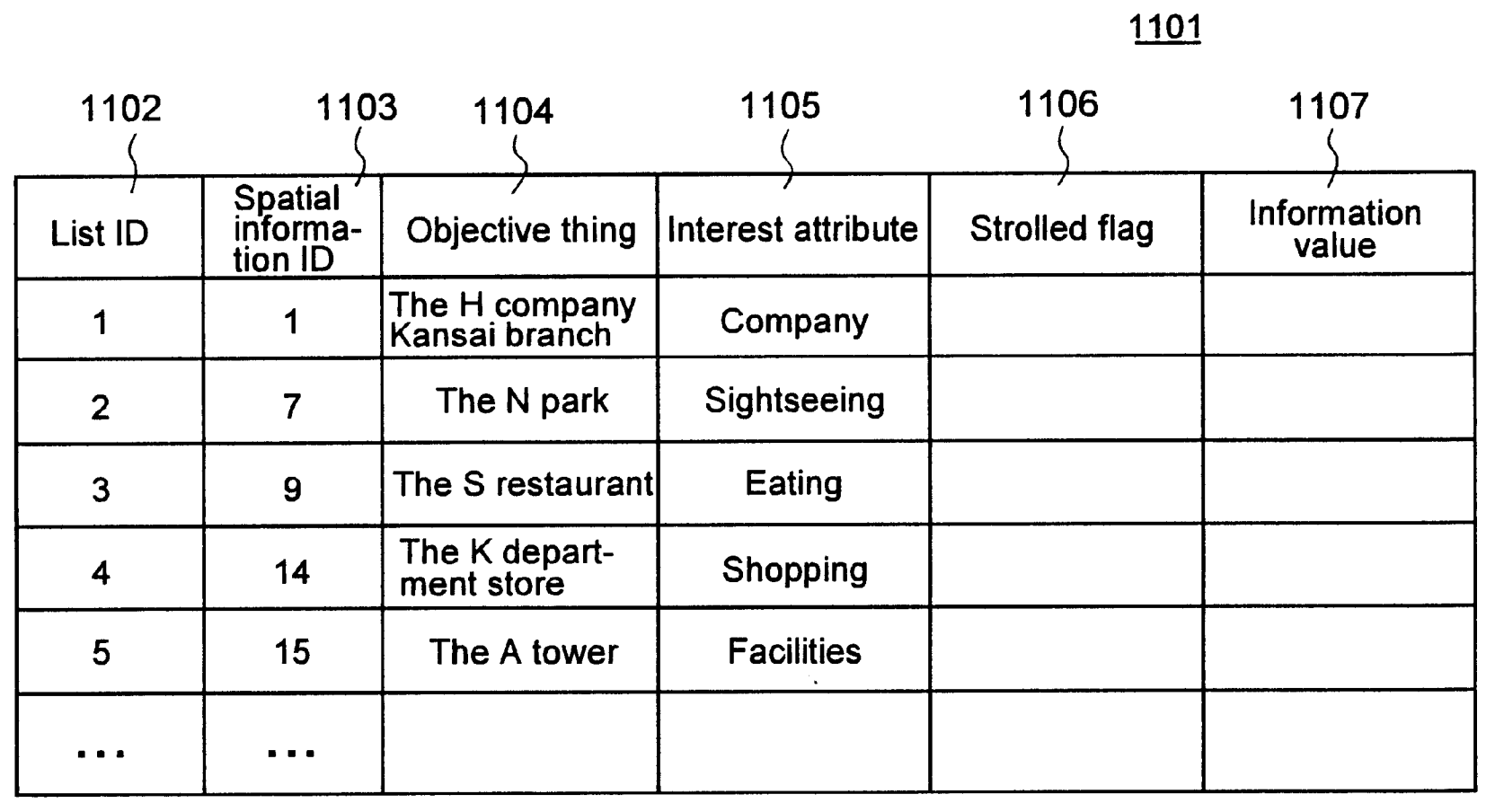

| List ID 1102 | Spatial information ID 1103 | Objective thing 1104 | Interest attribute 1105 | Strolled flag 1106 | Information value 1107 |
|---|---|---|---|---|---|
| 1 | 1 | The H company Kansai branch | Company | | |
| 2 | 7 | The N park | Sightseeing | | |
| 3 | 9 | The S restaurant | Eating | | |
| 4 | 14 | The K department store | Shopping | | |
| 5 | 15 | The A tower | Facilities | | |
| ... | ... | | | | |

| List ID 1202 | Spatial information ID 1203 | Objective thing 1204 | Interest attribute 1205 | Strolled flag 1206 | Information value 1207 |
|---|---|---|---|---|---|
| 1 | 1 | The H company Kansai branch | Company | | 3 |
| 2 | 7 | The N park | Sightseeing | | 10 |
| 3 | 9 | The S restaurant | Eating | | 5 |
| 4 | 14 | The K department store | Shopping | | 10 |
| 5 | 15 | The A tower | Facilities | | 10 |
| ... | ... | | | | |

| List ID 1302 | Spatial information ID 1303 | Objective thing 1304 | Interest attribute 1305 | Strolled flag 1306 | Information value 1307 |
|---|---|---|---|---|---|
| 1 | 1 | The H company Kansai branch | Company | | 3 |
| 2 | 7 | The N park | Sightseeing | 1 | 9 |
| 3 | 9 | The S restaurant | Eating | 1 | 5 |
| 4 | 14 | The K department store | Shopping | 3 | 9 |
| 5 | 15 | The A tower | Facilities | | 7 |
| ... | ... | | | | |

MAP APPLICATION SYSTEM

BACKGROUND OF THE INVENTION

The present invention relates to a map application system and map display control method that are useful for indicating spatial information sequentially where a great amount of spatial information (information related with each place of a map) collected from various information sources exists. In particular, the present invention relates to a map application system and map display control method that can follow a route according to a user's interests inside a virtual space of existing information by determining a stroll route according to the degree of the interest of the user against spatial information and indicating spatial information sorted by the degree of the interest of a user sequentially along a route.

A conventional electronic map information system and car navigation system are described below.

(1) Electronic map information system

In a conventional electronic map information system, it is necessary to show a portion of an area by using a portion of the data of an extensive area. It is important to indicate which position of the overall figure is represented by the area that is being shown due to the limit in the display area that can be shown. One technique to solve the problem is shown in JP-A-6-252324. This figure display apparatus shows the entire figure combined with a partial figure of a detailed area. That is, the entire figure is displayed on a subscreen, and the partial figure is displayed on a main screen. The area that corresponds to an area segmented and shown as a partial figure is indicated on the illustration of the entire figure.

(2) Car navigation system

A car navigation system is one that shows the current position of a car on a map by using satellite information. For example, according to a car navigation system disclosed in JP-A-5-27680, digital map data is stored in a storage medium such as a CD-ROM (compact disc-read only memory) or a FD (flexible disk), a map is displayed on a display such as a CRT (cathode-ray tube) or an LCD (liquid crystal display) on the basis of the stored data, and a current position of a vehicle is determined using a GPS satellite system and shown on the map.

However, by using the conventional position display apparatus, a great amount of labor and a very high cost, on the order of a million dollars, are needed for creation of the map database of a digital map. The main problem is that the map information displayed on a display screen is remarkably less than the commercially available map book, etc., made of paper due to the limitation such as the size and the resolution of a display screen. Therefore, in order to search a position easily and promptly on the map in a map book made of paper, the current position of a concerned vehicle, the page number of the map book, and the progress locus, etc. of the position are displayed on the display screen of a display device.

Conventional electronic map information systems and car navigation systems suffer from the technical problem of not being able to clearly describe information in connection with spatial information such as a map in the display apparatus whose size was limited. There is, in these prior art, a problem that contents cannot be surveyed efficiently on the display device in case large information resources including positional data are integrated and used.

SUMMARY OF THE INVENTION

An object of the present invention is to overcome the above-mentioned problems of the prior art and to provide a map application system and a map display control method in which it is possible to stroll along a virtual space composed of information of that which is existing such as leisurely walking in an existing street by sequentially displaying information desired by the user according to the user's interest. Another object of the present invention is to provide a map application system and a map display control method by which a user can discover unexpected information that is indicated by a spacious row on the stroll route into which even if he or she strolls along the same place, the kind of the information that is indicated and a stroll route are changed according to the interest of the user.

These and other objects of the present invention can be achieved as follows.

The map application system of the present invention is realized by a computer system which provides an automatic stroll means using a stroll terminal. The information that is dealt with on the stroll terminal is acquired from a contribution server through a communication means. A large quantity of information is stored in the contribution server as it relates to a spatial position. The contribution server returns information with the relation to the position of the region input to the stroll terminal according to region name as distribution information. At this time, distribution information is controlled or is managed according to the following procedures at the stroll terminal.

First, at least one aspect of user interest information is registered. When the information that specifies a position is input, a present position is specified. At least one aspect of distribution information of the neighborhood at the present postion is spatially located, and weighting according to the distance from the present position of distribution information and user interest information is done. On the basis of such weighting, the destination that corresponded to a present position is calculated from distribution information. A node is calculated for a route between a present position and a destination. Distribution information of the neghborhood at the node is selected according to user interest information. The selected distribution information is displayed sequentially along a path with nodes on the display device. A map including the present position is displayed on the display device at the beginning when the distribution information is displayed on the display device. The-object indicating the present position is displayed on the display device. The distribution information of a present position is displayed adjacent to the map according to an user's interest. Finally, the map is smoothly scrolled as the present position moves in a destination direction.

This display processing is repeated sequentially in route order. Thus, a stroll is started with a region name inputted as an initial value on the stroll terminal, a spatial route is set, information along the set route is inputted from a contribution server, and the inputted information is suitably displayed.

These and other objects, features and advantages of the present invention will become readily apparent in view of the following detailed description of the preferred embodiments in connection with the drawiings.

BRIEF DESCRIPTION OF THE DRAWINGS

FIG. 9 is a structure explanation diagram of a spatial information DB.

FIG. 10 is a structure explanation diagram of user interest information.

FIG. 11 is structure explanation FIG. 1 of a distribution information list.

FIG. 12 is structure explanation FIG. 2 of a distribution information list.

FIG. 13 is structure explanation FIG. 3 of a distribution information list.

DESCRIPTION OF THE PREFERRED EMBODIMENT

The embodiment of the map application system of the present invention will now be explained in more detail in conjunction with the drawings.
(The first embodiment)

Figure 1:
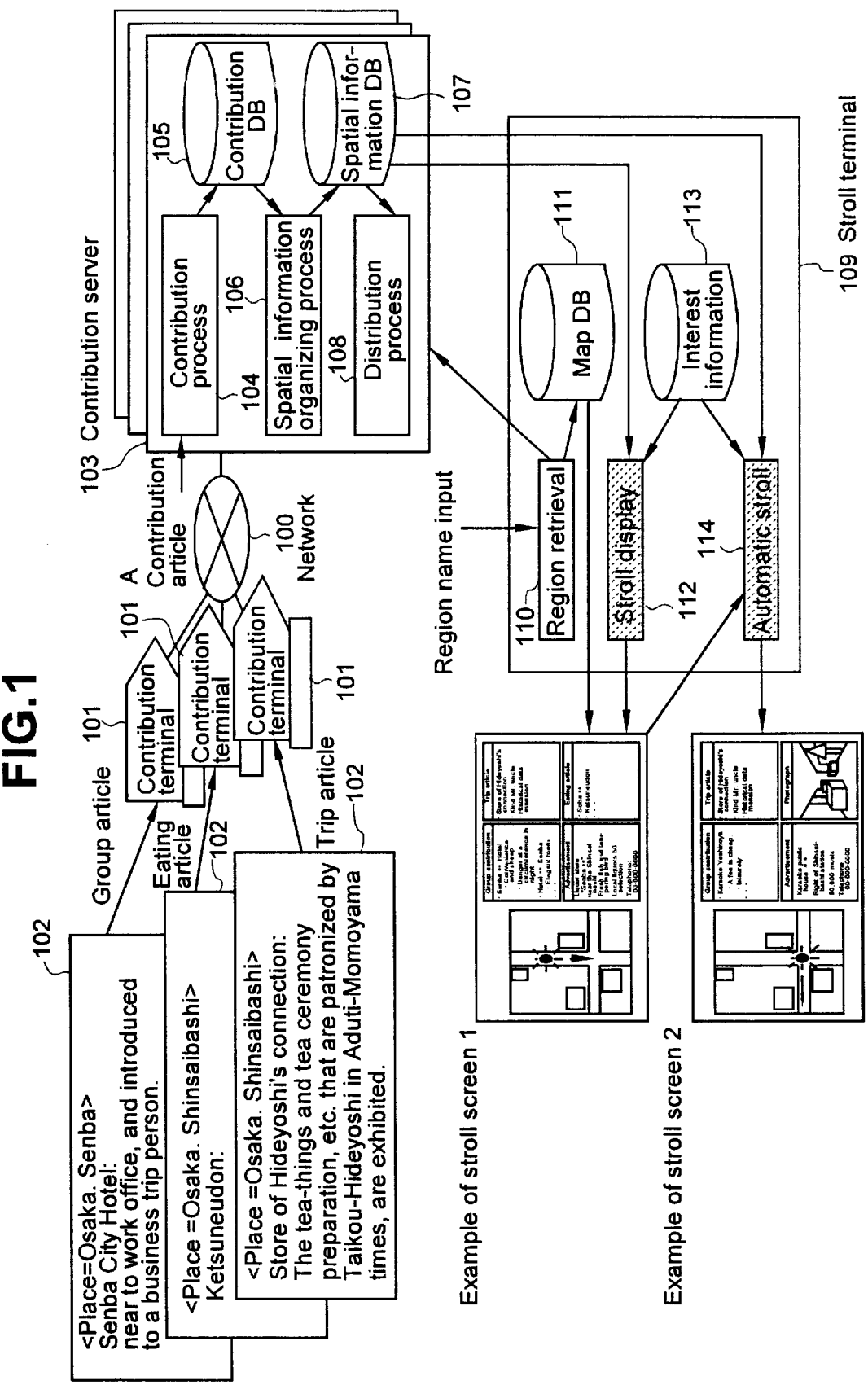
FIG. 1 illustrates an overall structure and the flow of information according to an embodiment of the present invention.

FIG. 1 illustrates an overall structure and the flow of information according to an embodiment of the present invention. First, information stored in a database will be explained in connnection with FIG. 1.

As shown in FIG. 1, the map application system according to the present invention includes a contribution terminal 101 to which a contributing person contributes an article, a contribution server 103 in which an article contributed is stored and managed by a stroll terminal 109 in which an article information stored in the contribution server 103 is retrieved and necessary information is derived from the contribution server 103 and the derived information is displayed, and a network 100 connecting the contribution terminal 101 and the contribution server 103. The contribution server 103 includes a contribution DB (database) 105 storing contribution articles and a spatial DB 107 storing a spatial attribute and a interest attribute derived from the contribution DB 105.

The stroll terminal 109 includes a map DB III storing map information and interest information related to interest and its degree for a user (owner of the concerned stroll terminal). For example, the contribution server 103 is an apparatus consisting of an ordinary computer. Even if the stroll terminal 109 is a portable terminal, for example mobile type terminal, in which data is sent to and received from the contribution server 103 as needed, there is no problem. Alternatively, the contribution server 103 and the stroll terminal 109 can be combined into one apparatus.

The outline of the operation of an embodiment of the present invention will now be explained.

A contributor of information enters articles 102 from the contribution terminal 101. A spatial attribute related to position and an interest attribute related to object of an interest are included in the articles 102 at the time of contribution. The contribution terminal 101 is connected to the contribution server 103 through the network 100. By the contribution process 104 of the contribution server 103, the received contribution articles are stored into the contribution DB 105. At this time, a network address uniquely accessed throgh the network 100 is given to articles included in the contribution server 103. A spatial attribute and an interest attribute are derived from contribution articles stored in the contribution DB 105 by a spatial information organizing process 106, and stored into the spatial information DB 107.

As expained in more detail later using FIG. 9, the spatial information DB 107 is a database in which contribution article information can be retrieved spatially. Data of the spatial information DB 107 is delivered suitably by the distribution process 108 according to a request from the stroll terminal 109. The contribution server 103 has a structure of an ordinary computer system including a central processing unit (CPU), a storage device (ROM/RAM), an input a output device, a display device and a communication device, etc. The contribution process 104, the spatial information organizing process 106 and the distribution process 108 are executed by a CPU by reading programs stored in the storage device.

Given the whole structure and the outline of an operation explained above, the details of a present invention will now be explained. The computer system that is called a stroll terminal is one form of implementation of the map application system of the present invention.

While the stroll terminal 109 can be integrated with the contribution server 103 or be independent from the contribution server 103, a personal terminal comprising a central processing unit (CPU), a storage device (ROM/RAM), an input ouput device, a display device and a communication device can be used. While the present position can be inputted by an user, by providing automated position measurement equipment that automatically specifies a present position like the GPS system use position measurement equipment in a car navigation system, a present position specified with position automation measurement equipment can be used.

The stroll terminal 109 first reads a map specified by the region retrieval process 110 from the map DB111. Next, by stroll display process 112, a region name (or present position specified by an automated position measurement equipment) is inputted as an initial value and the display that imitated a stroll by referring to interest information 113 previously inputted by the owner (user) of the stroll terminal is started. That is, route setting is done by automatic patrol processing 114, and information along a route is inputted from the contribution server 103 and is suitably displayed. The details of a procedure for stroll display process 112 and automatic stroll process 114 are explained later. In the present invention, stroll display process 112 and automatic stroll process 114 are executed with a central processing unit (CPU) by reading programs stored in the storage device of the stroll terminal 109. In the second embodiment explained later, stroll display process 112 and automatic process 114 are executed with a central processing unit (CPU) by loading a corresponding program module from contribution server 103 when it becomes necessary. Thus, it is not necessary to previously hold these programs in the storage device of stroll terminal 109, so a storage device can be miniaturized.

Figure 2:
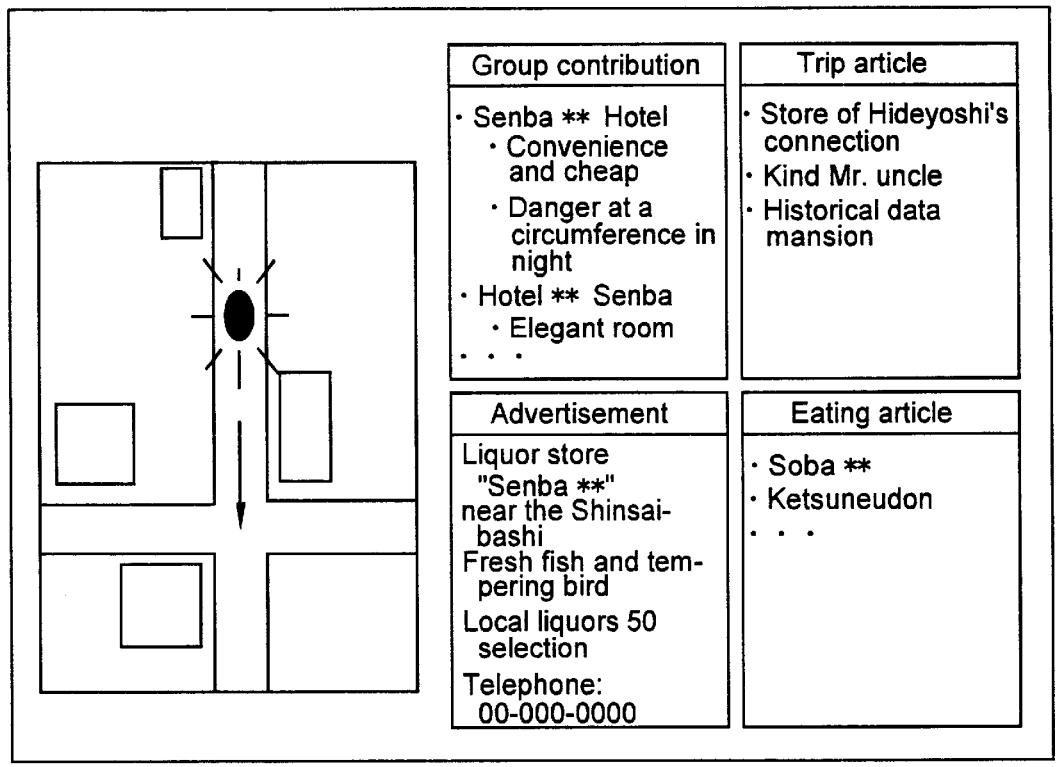
FIG. 2 is stroll screen example 1 on a stroll terminal.
Figure 3:
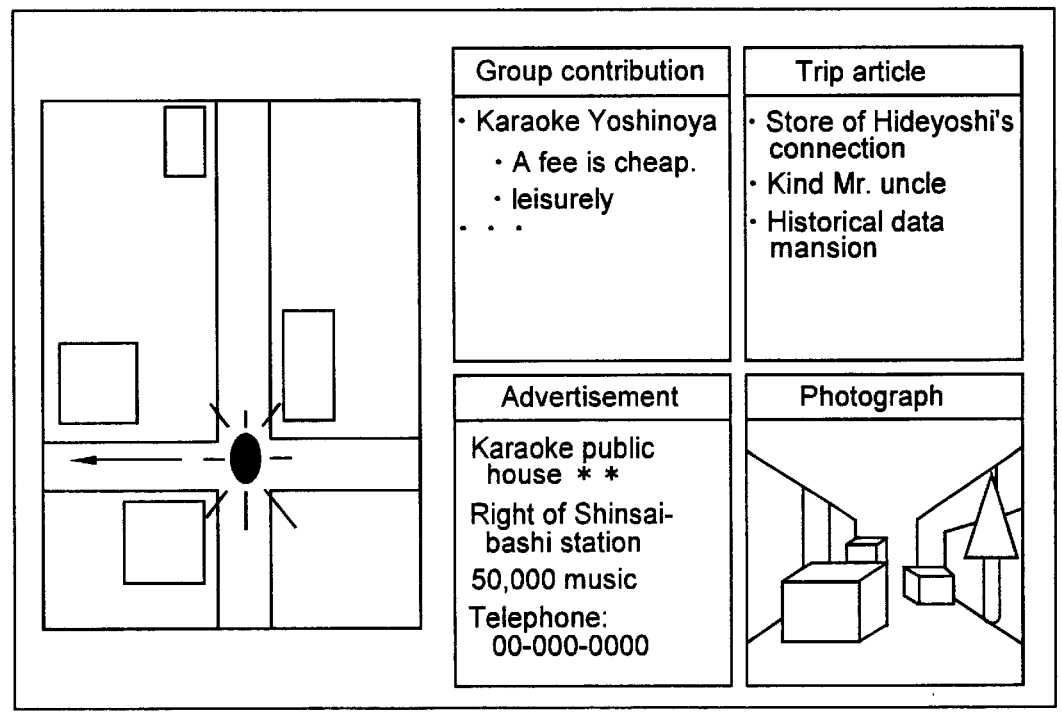
FIG. 3 is stroll screen example 2 on a stroll terminal.

FIGS. 2 and 3 are stroll screen examples displayed on a display of a stroll terminal.

First, the information presentation order to the display in the present invention is explained by using these stroll screen examples so that the effect of the present invention can be intuitively understood.

The left side of the display that displays a map on the stroll screen of FIG. 2 is prepared, and the right side of the display that displays region information is prepared. The mark that shows a present position on the map blinks, and the progress direction is shown with an arrow. The mark automatically advances along to the progress direction of a route, and region information corresponding to the course is updated sequentially according to the movement of the mark. On the other hand, an equivalent visual effect is gained by making a map scroll inversely with a progress direction of a mark being displayed in the same place on the screen. The region information is sorted according to the interest of a user, and for example an advertisement, etc., with a coupon ticket which can be presented to the user who is interested in the advertisement.

FIG. 3 is the stroll screen example continuing from FIG. 2. In FIG. 3, when a map application system judges that the density of information that is interesting for a user is great on the screen's left side (the progress direction being to the right side), the mark begins to advance in a way that is different from the former route by automatically changing the progress direction of the mark into another direction (refer to the arrow in FIG. 3). The density of information mentioned above is calculated by executing weighting process on the basis of a user's interest.

Figure 4:
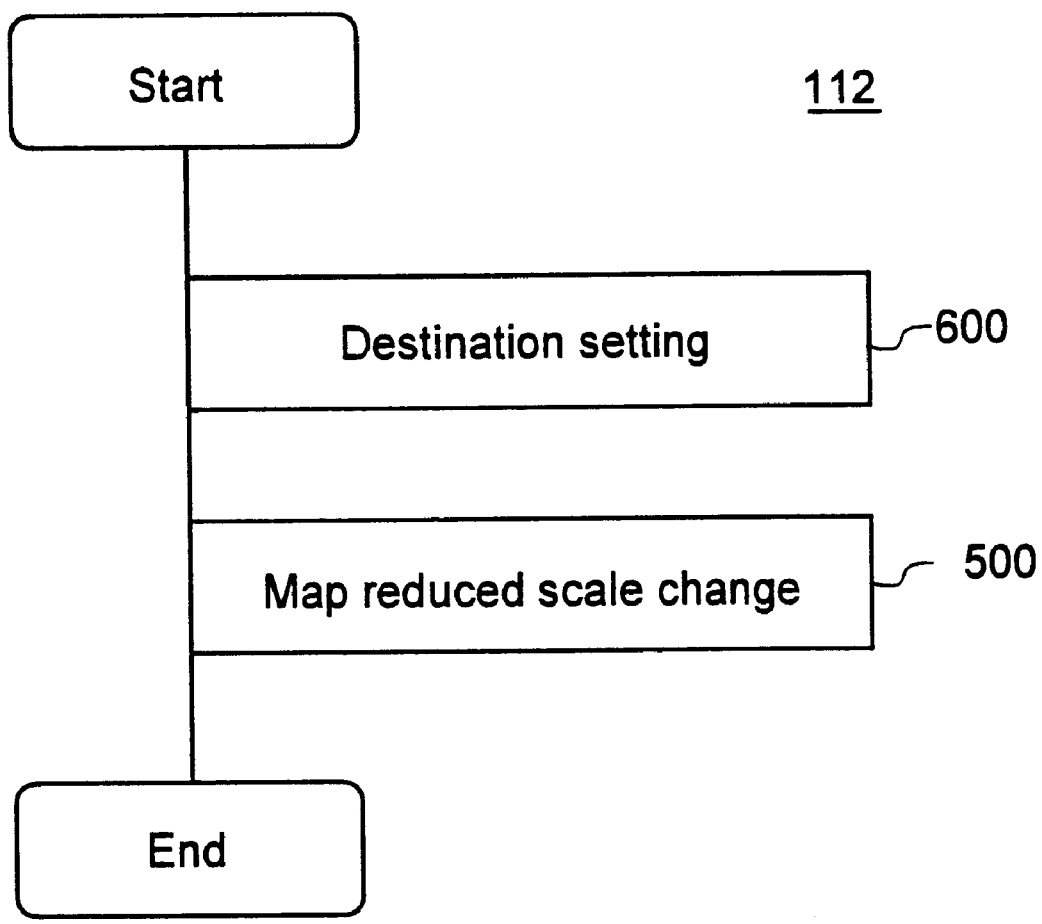
FIG. 4 is a processing procedure explanation diagram of a stroll display.

FIG. 4 shows the processing flow of a stroll display process shown in FIG. 1. The stroll display process is composed of a map reduced scale change process 500 and destination setting process 600 that is explained in detail below.

Figure 5:
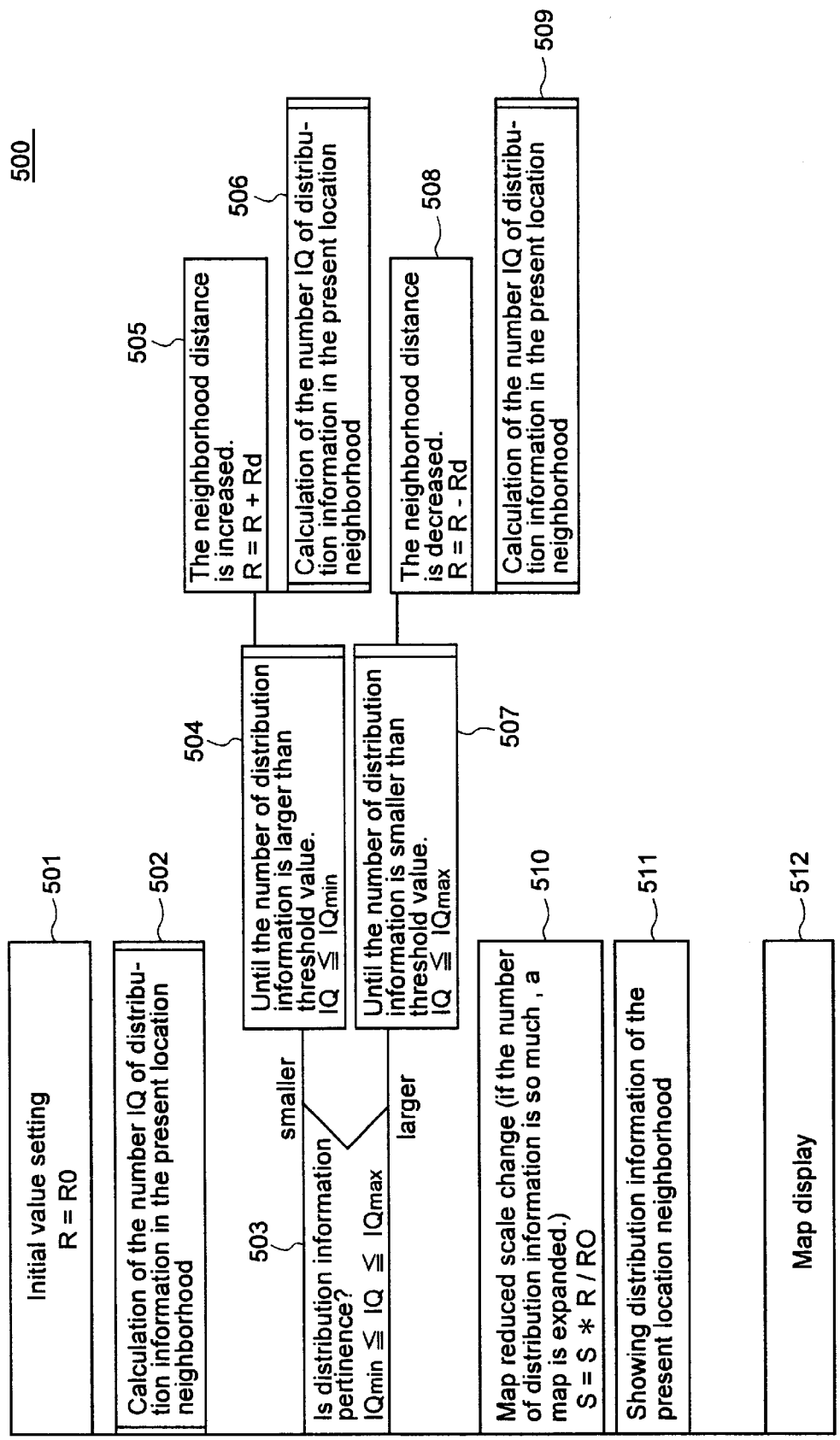
FIG. 5 is a processing procedure explanation diagram of a map reduced scale change.

FIG. 5 is a detailed explanation diagram of the processing flow of map reduced scale change process 500 shown in FIG. 4.

Map reduced scale change processing 500 keeps the quantity of the information displayed on the screen to some extent constant by changing a map into a wide area map if the density of contribution information in a certain region becomes looser. Because the map that is displayed is changed into a wide area map, the user can look at information comfortably.

In the setting of the initial value of step 501 of FIG. 5, initial value R0 is set at neighborhood distance R. The number IQ of distribution information that is in the neighborhood of a present location is calculated in step 502. This calculation process is explained in detail later by using FIG. 8.

In step 503, a comparison (IQmin≦IQ≦IQmax) is made by comparing the number IQ of distribution information with minimum value IQmin and maximum value IQmax of the threshold of the tolerance. In case the number IQ of distribution information is smaller than minimum value IQmin (IQ<IQmin), until the number IQ of distribution information becomes larger or equal to the threshold IQmin (IQ≧IQmin), the following processes (step 505 and 506) are repeated in step 504. First, the value of neighborhood distance R is increased only RD in step 505 (R=R+RD). The number IQ of distribution information is calculated again in step 506.

Conversely, in case the number IQ of distribution information is larger than maximum value IQmax in step 503 (IQ>IQmax), similarly, until the number IQ of distribution information becomes less than or equal to the maximum value IQmax (IQ≦IQmax), the following processes (step 508 and 509) are repeated in step 507. First, the value of neighborhood distance R is decreased only RD in step 508 (R=R−RD). Next, the number IQ of distribution information is calculated again in step 509.

Thus, by changing the distance that is considered to be the neighborhood around a certain place, the quantity of the information that is displayed can be to some extent kept constant.

After it is judged in step 503 that the number IQ of distribution information is adequate, then, a reduced scale of a map is changed in step 510. A reduced scale of a new map is calculated by multiplying the ratio of initial value R0 of the neighborhood distance and the value of the neighborhood distance R given after adjustment of the number of distribution information to reduced scale S of the present (S=S*R/R0). A distribution information corresponding to the neighborhood of a present location is displayed in following step 511, and a map changed by a new reduced scale is displayed in step 512.

Figure 6:
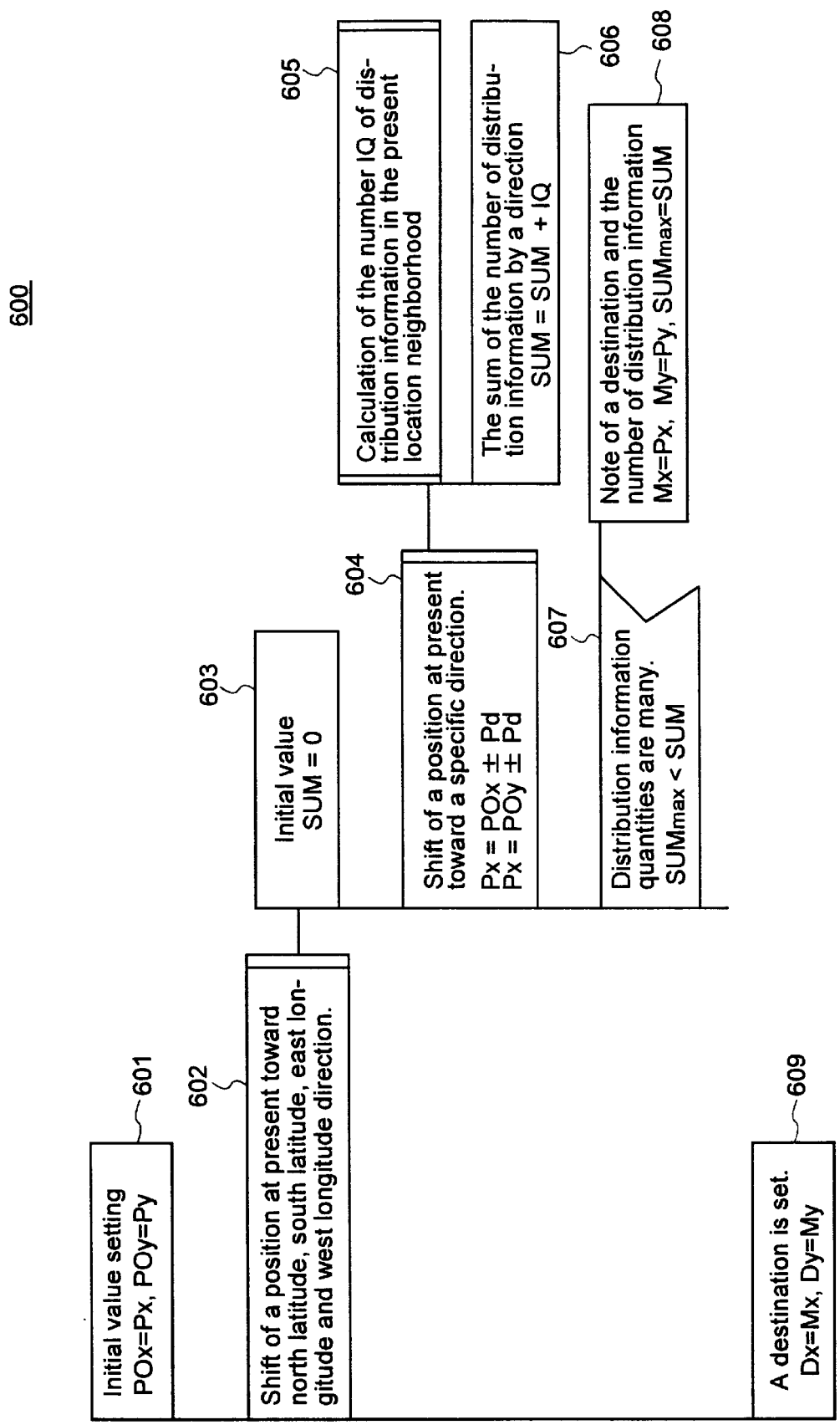
FIG. 6 is a processing procedure explanation diagram of destination setting.

FIG. 6 is a detailed explanation diagram of the processing flow of destination setting process 600 shown in FIG. 4.

A destination setting process 600 calculates the direction of stroll in which more information that is useful can be discovered at the time of starting the stroll from the present position.

That is, it is determined whether it heads for which direction as a whole by process 600 separately with a selection whether it should stroll to the right or the left of each crossing or continue straight ahead.

In FIG. 6, in step 601, a present position is expressed with the north latitude Px and the east longitude Py, and these values are stored into initial values P0x and P0y for the note of a stroll start place (P0x=Px,P0y=Py). And, P0x and P0y, etc. can show a parameter, and each can be made to correspond to the specific memory address and a register.

The process described below is repeated, in step 602, by shifting a present position first in the north latitude direction, in the south latitude direction, in the east longitude direction and in the west longitude direction. That is, in step 603, SUM storing the total value of the number of distribution information is initialized to 0. A repeating process of shifting coordinates in the specific direction in step 604 is done. For example, in case it heads for the north latitude direction, only constant Pd is increased for every repeat by the value of Py (Py=P0y+Pd).

In step 605, the number IQ of distribution information in the new position PX and PY neighborhood after moving position by only PD is calculated. In step 606, total value SUM of the number of distribution information is updated (SUM=SUM+IQ). After doing this process by only the specified number of repeats in step 604, it is determined whether a maximum record by the progress direction of the total value of the number of distribution information is updated in step 607. If total value SUM of the number of distribution information is larger than maximum record SUMmax (SUMmax<SUM), the value (Mx,My) of final spots after a movement and the value of SUMmax are updated, in step 608, respectively by the value of (Px,Py) and SUM at the time (Mx=Px,My=Py,SUMmax=SUM).

After repeating processes of steps 603 to 608 for the four directions east, south, west and north, destination (Mx,My) recording the maximum number of distribution information is set as destination (Dx,Dy) in step 609 (Dx=Mx,Dy=My).

The place where there is information with the highest evaluation within radius 10 km can be made a destination by dividing the mesh of a lattice-form into every region and counting the number of distribution information in each mesh.

Figure 7:
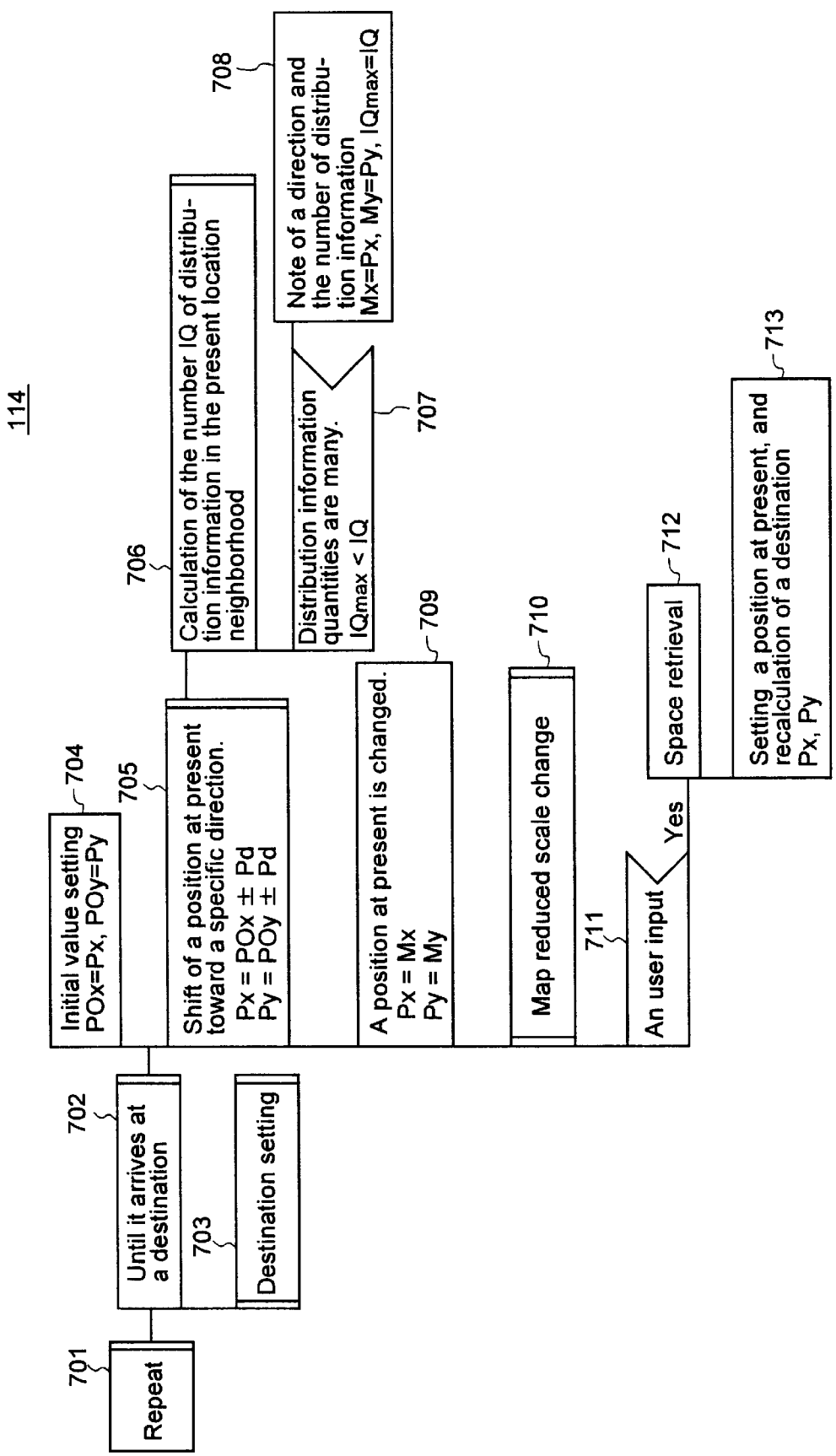
FIG. 7 is a processing procedure explanation diagram of automatic stroll.

FIG. 7 shows the processing flow of the automatic stroll process 114 shown in FIG. 1.

After displaying the related information that is concerned with a present position with a map by stroll display process 112, automatic stroll process 114 automatically updates the present position and strolls along a region. Until a stop interruption of the automatic patrol processing 114 is received from the user in step 701, the following processes (steps 702 and 703) are repeated. Processes (steps 704 to 713) after step 704 are repeated in step 702 until arriving at a destination. Then, upon arrival of the destination, the present destination is made the present position and a new destination is set again in step 703 by destination setting process 600 explained in FIG. 6. Then, by a process of iterating step 701, automatic stroll is repeated.

Processes after step 704 are processes to determine the stroll route from a certain position to the destination one after another and approach to a destination gradually.

First, in step 704, a present position is expressed with the north latitude Px and the east longitude Py, and these values are stored into initial values P0x and P0y for the note of a stroll start place (P0x=Px,P0y=Py). The process described below is repeated, in step 705, by shifting a present position first in the north latitude direction, in the South latitude direction, then in the east longitude direction and then in the west longitude direction. For example, in case it heads for the north latitude direction, only constant Pd is increased for every repeat by the value of Py (Py=P0y+Pd).

By using Px and Py showing the coordinates of a new place after moving position by PD, the quantity of distribution information of the neighborhood, that is, the number IQ of distribution information is calculated in step 706. In the following step 707, maximum record IQmax by the progress direction of the number IQ of distribution information is compared with the number IQ of distribution information calculated, and it is judged to head for the direction in which an information quantity increases. If the number IQ of distribution information is larger than maximum record IQmax (IQmax<IQ), the value (Mx,My) of position after a movement and the value of IQmax are updated, in step 708, by the value (Px,Py) of position and the number IQ of distribution information at the time (Mx=Px,My=Py, IQmax=IQ).

After repeating processes of steps 705 to 708 for the four directions of the east, south, west and north, destination (Mx,My) recording the maximum number IQmax of distribution information is set to position of the present as next stroll place in step 709 (Px=Mx,Py=My). A display of a map is updated by using map reduced scale change process 500 explained in FIG. 5 based on a new present position in following step 710.

By In case there are direct instructions from the user, processing of the present is interrupted in step 711. The place designated by a user is retrieved in step 712. For example, in case Osaka is selected by indicating a user, the center of Osaka is set again as a present position, and the calculation of a destination is done again in step 713.

Figure 8:
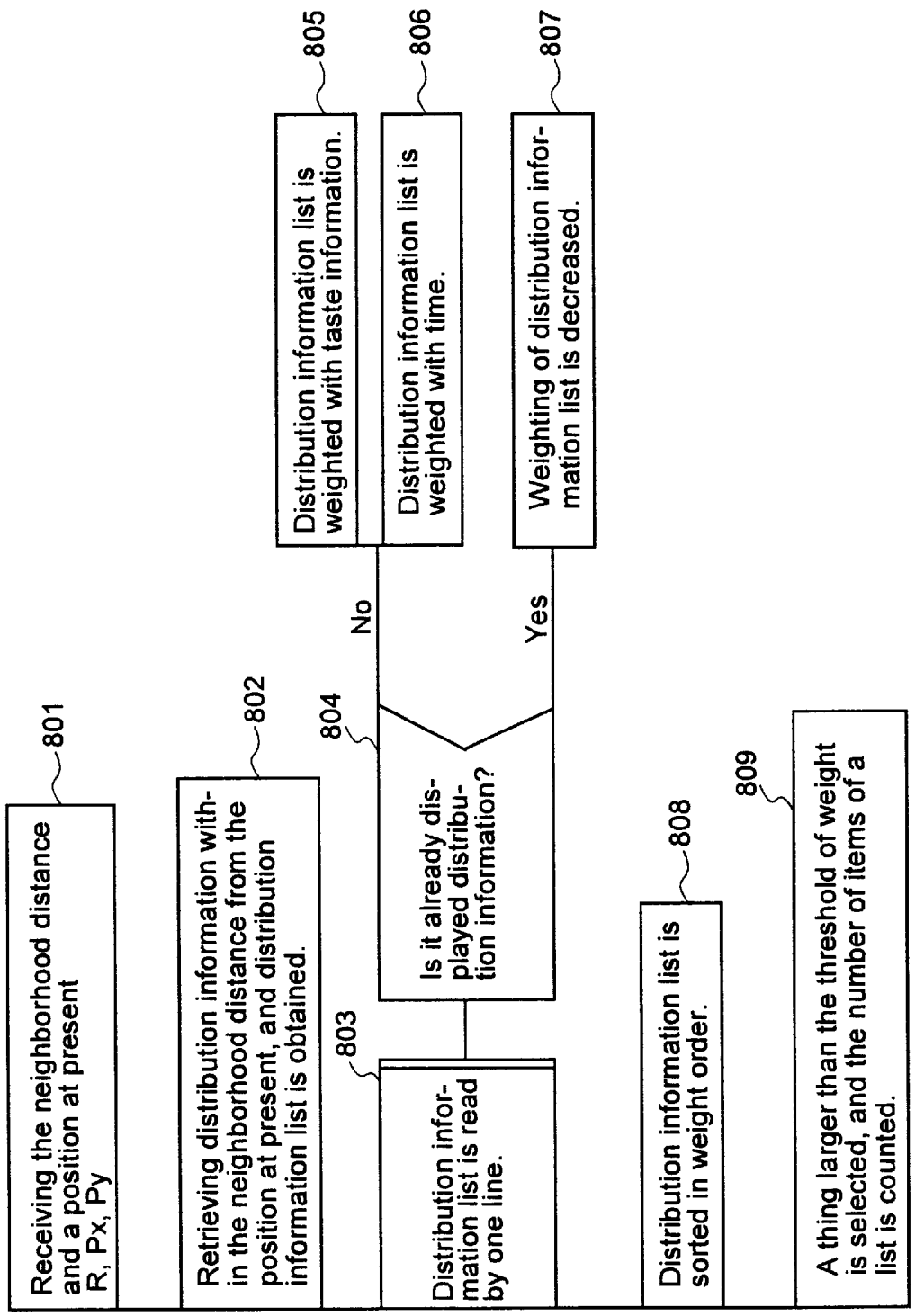
FIG. 8 is a processing procedure explanation diagram of a calculation of the number of the neighborhood distribution information.

FIG. 8 is the processing flow of calculation process of the number of the neighborhood distribution information for checking distribution information that is in the neighborhood of a certain place, doing weighting adjusting to a user preference and creating a distribution information list, and it is corresponding to processing of step 502, 506 and 509 of FIG. 5, step 605 of FIG. 6 and step 706 of FIG. 7.

For the various information used for processing of FIG. 8, there is the example of the table structure figure of spactial information DB107 shown in FIG. 9, the example of the structure of interest information 113 registering user's interest shown in FIG. 10, and the example of distribution information list shown in FIG. 11, FIG. 12 and FIG. 13. As follows, by using FIG. 8 to FIG. 13, a method of calculating the number IQ of distribution information in the present location neighborhood is explained.

Coordinate value (Px,Py) denoting a present position and neighborhood distance R are received in step 801 of FIG. 8. A calculation processing of the number of the neighborhood distribution information calculates the number of the neighborhood distribution information by using received parameter (Px,Py,R), if control is transferred from the map reduced scale change process (FIG. 5 reference), the destination setting process (FIG. 6 reference) and the automatic stroll process (FIG. 7 reference).

In step 802, distribution information corresponding to within the neighborhood distance R from present position (Px,Py) is retrieved from spatial information DB 107, and the retrieval result is stored in distribution information list. The structure of space information DB 107 is explained in detail later by using FIG. 9. An example result retrieved from spatial information DB 107 of FIG. 9 in step 802 of calculation process of the number of the neighborhood distribution information of FIG. 8 is shown in distribution information list 1101 of FIG. 11. FIG. 11 is explained later, and an explanation of FIG. 8 is continued here.

By reading the distribution information list by one line, the following process is repeated in step 803. In step 804, it is distinguished on the basis of the number of having strolled of FIG. 11 whether a distribution information read is a distribution information displayed already on a display device.

If one line previously read is the first information, weighting to the field 1107 of the information value in distribution information list 1101 is done in step 805 by using the interest information of FIG. 10. FIG. 12 shows the example of distribution information list 1201 that did weighting.

In addition, weighting processing by time is executed in a step 806. In weighting processing by time (not illustrated), for example, if the time was at night, the evaluation of a sightseeing in interest attribute 1105 is lowered from 10 points to 5 points, and the evaluation of a meal is increased from 5 points to 8 points.

On the other hand, in case the figure showing a number have been stored in the number 1106 of having strolled corresponding to one line previously read, the value of weighting of distribution information list is reduced in step 807. An example of reducing a value of which an information value 1307 is decreased according to a stroll number entered in the number 1306 of having strolled is shown in FIG. 13. FIG. 13 is an example that decreasing value of weighting per one time of the number of having strolled is set as 1 point. The value of weighting shown in FIG. 12 is decreased according to the number of having strolled as it is shown in FIG. 13.

In step 808, distribution information list 1307 is sorted in weight order. In step 809, the item having the value of weighting larger than the threshold of weighting previously set is selected from distribution information list 1307, and the number of selected items is counted.

In order to retrieve the spatial information within the area that is decided with a specified radius from a certain point, for example, spatial information DB needs to have information structure like FIG. 9.

In FIG. 9, the spatial information DB comprises distribution information table 901, and distribution information table 901 is composed of the fields of ID 902, network address 903, spatial attribute 904 and interest attribute 908. The spatial attribute 904 includes the subfields of address 905, area 906 and target object 907. In FIG. 9, an example of representing area 904 by coordinates of two points of the upper-left and the lower-right representing a 4 square shape area has been shown. In a process of judging whether a 4 square shape area is included in the neighborhood distance within from specific position (X0,Y0), coordinates (X,Y) of the center of gravity position of 4 square shapes are calculated from information of the area 906 of each record of distribution information table 901, the record contained within the neighborhood distance is retrieved by a large and small relation comparison of distance |(X0,Y0)–(X,Y)| between 2 points and the neighborhood distance.

FIG. 10 shows the structure of the interest information of a user. Interest information table 1001 is composed of interest attribute 1002 and information value 1003, and it is a table for registering information showing whatever information value 1003 for each of interest attribute 1002 is given by the user.

FIG. 11 is an example of distribution information list. The distribution information list 1101 consists of fields of a-list ID 1102, spatial information ID 1103, target object 1104, interest attribute 1105, number 1106 of having strolled and information value 1107. The retrieval result is stored in the field of spatial information ID 1103, target object 1104 and interest attribute 1105. List ID 1102 is an unique number in distribution information list. The spatial information ID 1103 is the number corresponding to ID 902 in distribution information table 901, and ID 902 fitting to a retrieval is stored as spatial information ID 1103. Similarly, target object 1104 and interest attribute 1105 correspond to target object 907 and interest attribute 908 respectively, and are the fields storing each of retrieval results. The number 1106 of having strolled and the information value 1107 are used by the calculation mentioned later.

FIG. 12 shows an example of storing a figure into a field of which the information value 1207 of the individual record of distribution information list 1201 shown in FIG. 11 on the basis of interest information table 1001 of FIG. 10.

FIG. 13 shows an example of updating the value of number 1306 about the place having passed once as it strolled by automatic stroll process of FIG. 7, and decreasing a value of an information value 1307 shown in FIG. 12. Here, a number 1306 of having strolled and a value of an information value 1307 are updated in step 511 of FIG. 5.

(The second embodiment)

The second embodiment of the present invention will now be explained as follows.

In the second embodiment, the map application system is composed of a server system and a client system that are possible to mutually communicate through a communication line. The spatial information DB 107, interest information 113, distribution information list 1101 and the automatic stroll program module that described an automatic stroll means are stored in the server system. On the other hand, client system acquires and executes the all or part of this automatic stroll program module through a communication line. The automatic stroll program module is composed of programs that execute each process of a stroll display (FIG. 4), a change of a map reduced scale (FIG. 5), a destination setting (FIG. 6), an automatic stroll (FIG. 7) and a calculation of the number of the neighborhood distribution information (FIG. 8) which are explained above. For example, in case it is necessary to dynamically adjust the kind and distribution number of distribution information adjusting to a user's interest and time, the processing program of a calculation of the number of the neighborhood distribution information is read from the server system and is executed in the client system.

According to the present invention, the information of a user's interest that is concerned with the place is displayed sequentially even if a present position shifts on the map. Thus, a user can stroll along a virtual space as if leisurely walking down an existing street. In addition, an user can discover unexpected information that is indicated on the stroll route into which even if one strolls along the same place, the kind of the information that is indicated and a stroll route are changed according to a user's interests.

Also, because there are few places that distribution information and program modules are stored, as in the second embodiment, computer resources are saved.

While the present invention has been described above in conjunction with the preferred embodiments, one of ordinary skill in the art would be enabled by such disclosure to make various modifications and still be within the scope and spirit of the present invention as recited in the appended claims.

What is claimed is:

1. A map application system having a display device, a storage device and a processing unit for displaying a map of a neighborhood of a present position and information related with the present position on the display device, comprising:

first means for calculating a destination that is a next position displayed after displaying the present position on the basis of the map stored in said storage device and present position information that has been input and calculating a spatial route from the present position to the destination;

second means for arranging in order contents of distribution information associated with a spatial position along said spatial route;

third means for displaying sequentially on said display device said distribution information in order along said spatial route;

fourth means for updating said present position information after having displayed all of said distribution information; and means for calculating said destination corresponding to the present position on the basis of said distribution information by doing weighting for distribution information of the neighborhood at the present position by reference to a distance from the present position and interest information of a user in which a degree of an interest for a plurality of kinds of distribution information is included and stored in said storage device.

2. A map application system according to claim 1, wherein said present position is specified by external means.

3. A map application system according to claim 1, further comprising:

means for collecting coupon tickets corresponding to the neighborhood of present position from said distribution information including an advertisement with a coupon ticket.

4. A map application system according to claim 1, further comprising a automatic position measurement apparatus that specifies said present position.

5. A map application system according to claim 4, wherein weighting of said distribution information is changed according to time of day.

6. A map application system according to claim 1, further comprising:

means for calculating, for at least one route between the present position and said destination, nodes dividing said route, selecting distribution information corresponding to the position neighborhood at said node on the basis of interest information of a user including a degree of interest for a plurality of kinds of distribution information, and displaying on said display device said selected distribution information serially with said nodes along the route in order.

7. A map application system according to claim 6, further comprising:
  means for storing the position information corresponding to said displayed distribution information into said storage device when said distribution information is displayed on said display device;
  means for decreasing a value of weighting of said distribution information already displayed when weighting said distribution information; and
  means for decreasing a value of weighting of said route that has already been passed by referring to position information stored in said storage device.

8. A map display control method, using a processing unit with a display device and a storage device, for strolling along a virtual space composed of information of things that exist on a screen of said display device, the method comprising the steps of:
  (a) registering user interest information including degree of interest for a plurality of kinds of distribution information into said storage device;
  (b) inputting a present position;
  (c) receiving contents of distribution information associated with a spatial position, and doing weighting for distribution information of a neighborhood of said inputted present position on the basis of a distance from the present position and interest information of a user;
  (d) calculating a destination included in said-.distribution information on the basis of said weighting;
  (e) calculating, for at least one route between the present position and said destination, nodes suitably dividing said route;
  (f) selecting distribution information corresponding to a neighborhood at said calculated node on the basis of interest information of a user including a degree of interest for a plurality of kinds of distribution information;
  (g) displaying on said display device said selected distribution information serially with said nodes along the route in order; and
  (h) updating information of said present position after having displayed all of said distribution information, and repeating said steps (a) to (g).

9. A map display control method according to claim 8, wherein said step (g) further comprises the substeps of:
  (g1) displaying on said display device a map including a present position;
  (g2) displaying on said display device object indicating said present position;
  (g3) displaying said distribution information of said present position adjacent to said map according to the user's interests;
  (g4) scrolling smoothly said map so that said present position moves toward a destination direction; and
  (g5) repeating said steps (g3) and (g4).

10. A map display control method according to claim 8, wherein said step (g) further comprises the substeps of:
  (g6) changing a reduced scale of said map and displaying a wide area map in case a quantity of distribution information included in the neighborhood of the present position is smaller than a predetermined first value;
  (g7) changing a reduced scale of said map and displaying an expansion map in case in case a quantity of distribution information included in the neighborhood of the present position is larger than a predetermined second value; and
  (g8) changing a neighborhood distance calculation method adjusting to said map reduced scale changed in said step (g6) or (g7).

11. A map display control method according to claim 8, further comprising the step of:
  reading a program describing an automatic stroll procedure into said storage device through a communication means.

12. A map application system having a display device, a storage device and a processing unit for displaying a map of a neighborhood of a present position and information related with the present position on the display device, comprising:
  first means for calculating a destination that is a next position displayed after displaying the present position on the basis of the map stored in said storage device and present position information that has been input and calculating a spatial route from the present position to the destination;
  second means for arranging in order contents of distribution information associated with a spatial position along said spatial route;
  third means for displaying sequentially on said display device said distribution information in order along said spatial route;
  fourth means for updating said present position information after having displayed all of said distribution information;
  means for calculating said destination corresponding to the present position on the basis of said distribution information by doing weighting for distribution information of the neighborhood at the present position by reference to a distance from the present position and interest information of a user in which a degree of an interest for a plurality of kinds of distribution information is included and stored in said storage device;
  further comprising a automatic position measurement apparatus that specifies said present position; and
  wherein weighting of said distribution information is changed according to time of day.

13. A map application system having a display device, a storage device and a processing unit for displaying a map of a neighborhood of a present position and information related with the present position on the display device, comprising:
  first means for calculating a destination that is a next position displayed after displaying the present position on the basis of the map stored in said storage device and present position information that has been input and calculating a spatial route from the present position to the destination;
  second means for arranging in order contents of distribution information associated with a spatial position along said spatial route;
  third means for displaying sequentially on said display device said distribution information in order along said spatial route;
  fourth means for updating said present position information after having displayed all of said distribution information;
  means for calculating said destination corresponding to the present position on the basis of said distribution information by doing weighting for distribution information of the neighborhood at the present position by reference to a distance from the present position and interest information of a user in which a degree of an interest for a plurality of kinds of distribution information is included and stored in said storage device;

means for calculating, for at least one route between the present position and said destination, nodes dividing said route, selecting distribution information corresponding to the position neighborhood at said node on the basis of interest information of a user including a degree of interest for a plurality of kinds of distribution information, and displaying on said display device said selected distribution information serially with said nodes along the route in order;

means for storing the position information corresponding to said displayed distribution information into said storage device when said distribution information is displayed on said display device;

means for decreasing a value of weighting of said distribution information already displayed when weighting said distribution information; and means for decreasing a value of weighting of said route that has already been passed by referring to position information stored in said storage device.

14. A map application system having a display device, a storage device and a processing unit for displaying a map of a neighborhood of a present position and information related with the present position on the display device, comprising:

first means for calculating a destination that is a next position displayed after displaying the present position on the basis of the map stored in said storage device and present position information that has been input and calculating a spatial route from the present position to the destination;

second means for arranging in order contents of distribution information associated with a spatial position along said spatial route;

third means for displaying sequentially on said display device said distribution information in order along said spatial route;

fourth means for updating said present position information after having displayed all of said distribution information;

means for calculating said destination corresponding to the present position on the basis of said distribution information by doing weighting for distribution information of the neighborhood at the present position by reference to a distance from the present position and interest information of a user in which a degree of an interest for a plurality of kinds of distribution information is included and stored in said storage device; and means for collecting coupon tickets corresponding to the neighborhood of present position from said distribution information including an advertisement with a coupon ticket.

* * * * *